US009479795B2

(12) United States Patent
Cherigui et al.

(10) Patent No.: US 9,479,795 B2
(45) Date of Patent: Oct. 25, 2016

(54) METHOD AND DEVICE FOR ENCODING A BLOCK OF AN IMAGE AND CORRESPONDING RECONSTRUCTING METHOD AND DEVICE

(71) Applicant: THOMSON LICENSING, Issy de Moulineaux (FR)

(72) Inventors: Safa Cherigui, Villeurbannes (FR); Christine Guillemot, Chantepie (FR); Dominique Thoreau, Cesson Sevigne (FR); Philippe Guillotel, Vern sur Seiche (FR)

(73) Assignee: THOMSON LICENSING, Issy les Moulineaux (FR)

( * ) Notice: Subject to any disclaimer, the term of this patent is extended or adjusted under 35 U.S.C. 154(b) by 68 days.

(21) Appl. No.: 14/372,020

(22) PCT Filed: Jan. 7, 2013

(86) PCT No.: PCT/EP2013/050157
§ 371 (c)(1),
(2) Date: Jul. 13, 2014

(87) PCT Pub. No.: WO2013/104585
PCT Pub. Date: Jul. 18, 2013

(65) Prior Publication Data
US 2014/0355898 A1 Dec. 4, 2014

(30) Foreign Application Priority Data
Jan. 13, 2012 (EP) .................................... 12305050

(51) Int. Cl.
*G06K 9/36* (2006.01)
*H04N 19/567* (2014.01)
(Continued)

(52) U.S. Cl.
CPC ............ *H04N 19/567* (2014.11); *H04N 19/11* (2014.11); *H04N 19/14* (2014.11); *H04N 19/147* (2014.11);
(Continued)

(58) Field of Classification Search
None
See application file for complete search history.

(56) References Cited

U.S. PATENT DOCUMENTS

| 2009/0003443 | A1* | 1/2009 | Guo ..................... H04N 19/176 375/240.13 |
| 2009/0116759 | A1* | 5/2009 | Suzuki ................... H04N 19/61 382/238 |
| 2009/0180538 | A1* | 7/2009 | Visharam ............. H04N 19/176 375/240.15 |

FOREIGN PATENT DOCUMENTS

| WO | WO2007/093629 | 8/2007 |
| WO | WO2009126260 | 10/2009 |

OTHER PUBLICATIONS

Doshkov et al: "Towards Efficient Intra Prediction bgased on Image Inpainting Methods", Picture Coding Symposium 2010, Dec. 8, 2010, whole document.
(Continued)

*Primary Examiner* — Eueng-Nan Yeh
(74) *Attorney, Agent, or Firm* — Tutunjian & Bitetto, P.C.

(57) ABSTRACT

The invention relates to image block encoding and decoding. More precisely, the invention relates to block prediction using reference blocks of the image. It is proposed a method which comprises using processing means for using at least the block for determining one reference block in an already encoded part of the image, encoding and reconstructing a part of the image, using at least the block for determining one reference block in the reconstructed part and a vector referencing the one reference block, using the one reference block for determining at least one further reference block in the reconstructed part and encoding the determined vector and a residual of the block with respect to a combination of the one and the at least one further reference block. Using the block for determination of the one reference block allows for selecting it such that it resembles the block and correlation with the block is maintained.

30 Claims, 3 Drawing Sheets

(51) Int. Cl.
*H04N 19/176* (2014.01)
*H04N 19/147* (2014.01)
*H04N 19/593* (2014.01)
*H04N 19/11* (2014.01)
*H04N 19/14* (2014.01)
*H04N 19/52* (2014.01)
*H04N 19/44* (2014.01)
*H04N 19/65* (2014.01)

(52) U.S. Cl.
CPC ............ *H04N 19/176* (2014.11); *H04N 19/44* (2014.11); *H04N 19/52* (2014.11); *H04N 19/593* (2014.11); *H04N 19/65* (2014.11)

(56) References Cited

OTHER PUBLICATIONS

Guo et al: "Priority-based template matching intra prediction" 2008 IEEE Intl Conf., Jun. 23, 2008, pp. 1117-1120.

Moinard et al: "A set of template matching predictors for intra video coding"; Acoustics Speech and Signal Processing, 2010 ieee, Mar. 14, 2010, pp. 1422-1425.

Tan et al: "Intra Prediction by Template Matching", Image Processing, 2006 IEEE Intl Conf., Oct. 1, 2006. pp. 1693-1696.

Turkan et al: "Image prediction based on neighbor-embedding methods", IEEE Transactions on Image Processing, vol, 21, No. 4, Oct. 6, 2011, pp. 1885-1898.

Turkan et al. "Image prediction based on non-negative matrix factorization", Acoustics, Speech and Signal Processing, 2011 IEEE Intl Conf. May 22, 2011, pp. 789-792.

Turkan et al: "Image prediction: Template matching vs. sparse approximation", 2010 17th IEEE Intl Conf on Image Processing, Sep. 26, 2010, pp. 789-792.

Turkan el al: "Sparse approximation with adaptive dictionary for image prediction". Image Processing, 2009 16th IEEE Intl Conf. Nov. 7, 2009. pp. 25-28.

Search Report Dated Mar. 6, 2013.

Yu et al., "New intra prediction using intra macroblock motion compensation", JVT-C151, 3rd meeting of Joint Video Team (JVT)), May 2002.

Tan et al., "Intra prediction by averaged template matching predictors", IEEE Conf. Consumer Comm. Network. Conf. (CCNC), 2007, (published before this application Jul. 2014).

\* cited by examiner

METHOD AND DEVICE FOR ENCODING A BLOCK OF AN IMAGE AND CORRESPONDING RECONSTRUCTING METHOD AND DEVICE

This application claims the benefit, under 35 U.S.C. §365 of International Application PCT/EP2013/050157, filed Jan. 7, 2013, which was published in accordance with PCT Article 21(2) on Jul. 18, 2013 in English and which claims the benefit of European patent application No. 12305050.2, filed Jan. 13, 2012.

TECHNICAL FIELD

The invention relates to image block encoding and reconstructing. More precisely, the invention relates to block prediction using reference blocks of the image.

BACKGROUND OF THE INVENTION

Neighbor embedding is a technique used for determining predictions for residual encoding of image blocks and for reconstructing residual encoded image blocks.

In neighbor embedding reference blocks are determined for being combined for prediction or approximation of a block, determination of reference blocks being based on resemblance of spatial neighbourhoods of the reference blocks with a spatial neighborhood of the block. Resemblance between two blocks means that their semantic contents are similar.

This approximation or prediction can take place the same way at encoder side and at decoder side and only a residual of the prediction is conveyed or transmitted from the encoder to decoder.

SUMMARY OF THE INVENTION

For reference blocks determined solely on basis of resemblance of neighborhoods, the inventors recognized a potential lack of correlation with the block.

For encoding a block of an image it is therefore proposed a method and device according to the claims. Said method comprises using processing means for encoding and reconstructing a part of the image, using at least the block for determining one reference block in the reconstructed part and a vector referencing the one reference block, using the one reference block for determining at least one further reference block in the reconstructed part and encoding the determined vector and a residual of the block with respect to a combination of the one and the at least one further reference block.

Using the block for determination of the one reference block allows for selecting it such that it resembles the block and correlation with the block is maintained.

In an embodiment, a reconstructed neighborhood adjacent the block is further used for determining the one reference block.

In this or another embodiment, a reconstructed neighborhood adjacent the one reference block is further used for determining the at least one further reference block.

In further embodiments, combination of the one and the at least one further reference block can be a weighted linear combination. For instance, weights for said weighted linear combination can be determined by solving a constrained least square problem or a non local mean problem.

Either weights for said weighted linear combination are determined from the neighborhood adjacent to the block and the one neighborhood and at least one further neighborhood adjacent to the at least one further block.

Or weights for said weighted linear combination are determined using the block and the one reference block and the at least one further reference block and the determined weights are encoded.

In case of a constrained least square problem a solution can be determined using locally linear embedding or non-negative matrix factorization.

In yet further embodiments, at least the block is used for determining at least one other reference block in the reconstructed part and at least one other vector referencing the at least one other reference block. At least one other neighborhood adjacent to the at least one other reference block is used for determining at least one further other reference block in the reconstructed part, and it is determined that cost of a further residual of the block with respect to a further weighted linear combination of the one other and the at least one further other reference block is higher than cost of the residual, costs of the residual and the further residual being prediction costs or rate-distortion-costs.

For reconstructing a block of an image it is proposed a method and a device according to the claims. The method for reconstructing a block of an image comprises using processing means for reconstructing a part of the image, decoding an encoded residual of the block and decoding an encoded vector referencing a reference block in the reconstructed part, using the reference block for determining" at least one further reference block in the reconstructed part and reconstructing the block by combining the residual with a combination of the reference block and the at least one further reference block.

The features of further advantageous embodiments are specified in the dependent claims.

BRIEF DESCRIPTION OF THE DRAWINGS

Exemplary embodiments of the invention are illustrated in the drawings and are explained in more detail in the following description. The exemplary embodiments are explained only for elucidating the invention, but not for limiting the invention's disclosure or scope defined in the claims.

In the figures.

EXEMPLARY EMBODIMENTS OF THE INVENTION

The invention may be realized on any electronic device comprising a processing device correspondingly adapted. For instance, the invention may be realized in a television, a mobile phone, a personal computer, a digital still camera, a digital video camera, a navigation system or a video audio system.

Figure 1:
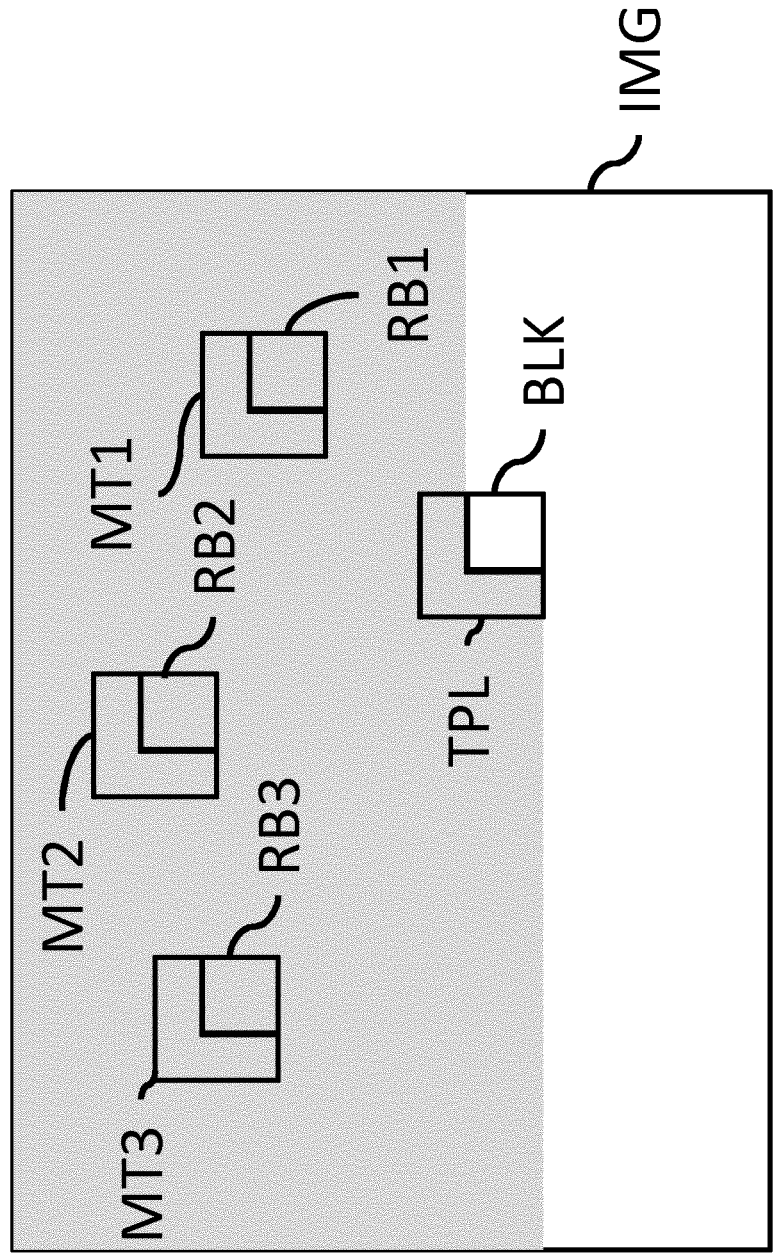
FIG. 1 depicts prior art neighbor embedding.

According to prior art reference blocks RB1, RB2, RB3 are determined such that templates MT1, MT2, MT3 adjacent to the reference blocks RB1, RB2, RB3 closely resemble a template TPL adjacent the block BLK to-be-encoded or to-be-reconstructed. This is exemplarily depicted in FIG. 1 wherein the grey area of image IMG is already reconstructed, at encoder side after encoding for use in prediction and at decoder side for use in reconstruction, and wherein the white area of image IMG is yet to be encoded or reconstructed.

In an exemplary embodiment of the proposed improvement of neighbour embedding methods, a vector VEC is used to take into account texture information of the current block BLK to be predicted.

That is a one reference block RB1 is determined such that it resembles the current block BLK, at encoder side by block matching and encoding of a reference vector VEC and at decoder side by decoding the encoded reference vector VEC. Resemblance or similarity of blocks can be measured using Euclidian distance, for instance, and minimal distance in a search area can be considered as a closest match. The search area can be the entire reconstructed image or a part thereof.

At least one further reference block RB2, RB3 is then determined the same way at encoder side as at decoder side. That is at least a second reference block RB2, RB3 is determined such that it resembles the one reference block RB1.

A pair of weights can be determined as to minimize rate-distortion costs of encoding of a residual of the block to be predicted with respect to a weighted linear combination of the one reference block with the at least one further reference block using the determined weights. Then the determined weights have to be encoded to enable decidability.

Figure 2:
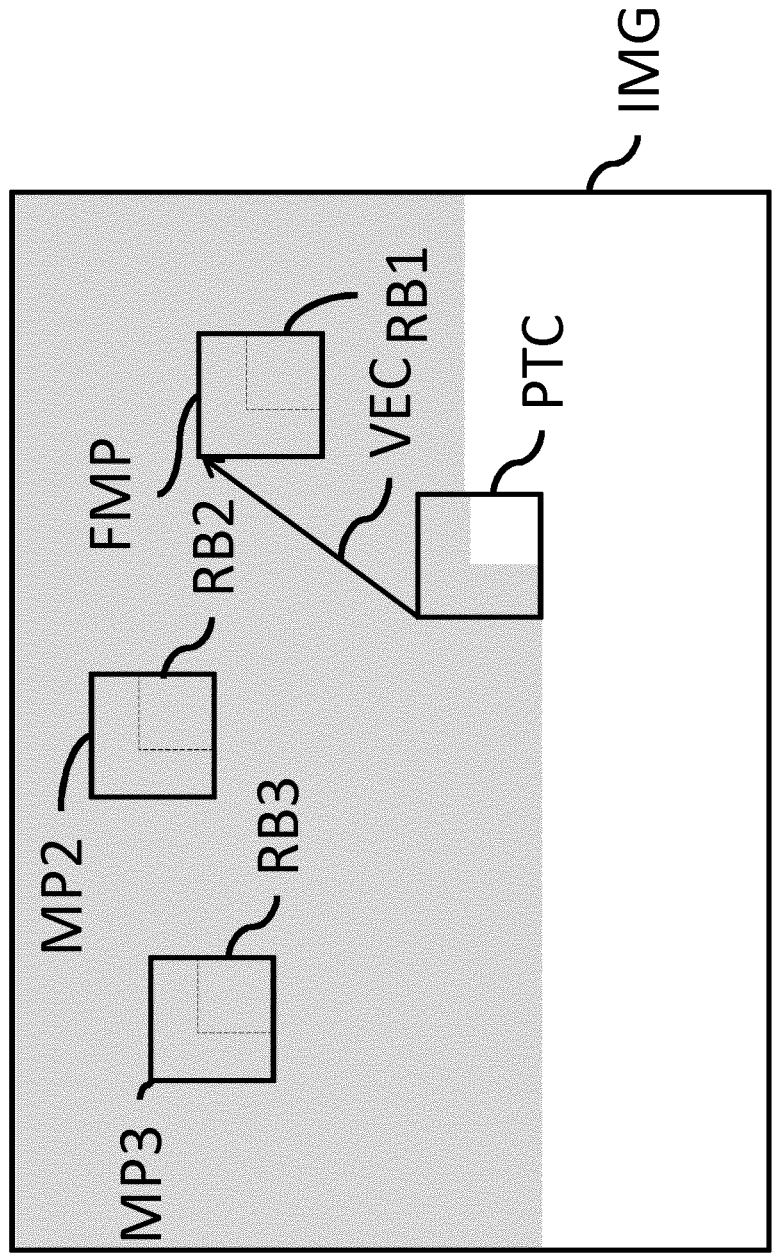
FIG. 2 depicts an exemplary embodiment of map-aided neighbour embedding.

In a further exemplary embodiment exemplarily depicted in FIG. 2, the one reference block RB1 is determined such that one reference patch FMP comprising one reference neighbourhood adjacent to the one reference block RB1 resembles a patch PTC comprising a corresponding neighbourhood of the current block and the current block BLK. Shape and position of neighbourhoods are depicted in FIG. 2 for illustrational purposes only, other shapes and positions are possible.

In yet a further exemplary embodiment the second reference block RB2 is determined such that a second reference patch MP2 comprising a second reference neighbourhood and the second reference block RB2 resembles the one reference patch FMP.

These concepts can be expanded towards selection of k patches wherein the block is predicted using a weighted linear combination of k blocks in the k patches. A one of the k patches is determined such that at least a one reference block comprised in the one patch resembles the block to be predicted. Or, the one of the k patches is determined such that it resembles a corresponding patch comprising the block to be predicted.

The remaining (k−1) patches are then determined such that reference neighbourhoods further comprised in the remaining patches resemble the neighbourhood comprised in the one of the k patches. Or as exemplarily depicted in FIG. 2, the remaining (k−1) patches are then determined such that they resemble the one of the k patches.

Stacked in a matrix (each patch being vectorised) the patches than can serve further to compute weighting coefficients. The patches are chosen to approximate the template pixels of the neighbourhood of the block to-be-predicted. This enables to obtain a set of patches and a corresponding weighting vector which are better adapted to estimate the unknown pixels of the block to be predicted. When based on template pixels only the weights can be determined the same way at encoder and at decoder side.

An exemplary embodiment of the concept expanded to k patches is a so-called Map-Aided Neighbour Embedding method (MANE) which one proceeds by a two-step search of the k patches of the input block to be predicted:

The first step consists in searching, using a block matching (BM) embodiment, the closest resembling reference patch of a current patch comprising the block to be predicted plus its corresponding neighbourhood, the neighbourhood also being called template. Since the closest resembling reference patch is determined using the current patch comprising the block to be predicted, a vector referencing the closest reference patch is part of an encoding. This step is done at encoder side. A decoder decodes the vector and uses it for determining the reference patch.

In a second step, the embodiment searches for (k−1) further reference patches being the (k−1) closest matches of the closest resembling patch found in the first step. This step can be performed the same way for encoding and decoding.

The distance used to determine the closest patch of the current patch and the (k−1) further reference patches is computed on the entire patch including pixels co-located to the current block plus the corresponding template pixels.

Examples of distance measures according to which candidate patches can be ranked for determining the (k−1) closest patches are Euclidian distance or mean square error between vectors formed by the pixels of the input patch and each of the candidate patches.

Once the k patches have been determined, in an embodiment the invention proceeds by solving the constrained least squares problems using for example the LLE or NMF methods respectively, so as to determine the weights to be used in the linear approximation of the block to be predicted.

Weights can be determined differently. In one embodiment, they are determined as to minimize rate-distortion costs of encoding of a residual of the block to be predicted with respect to a weighted linear combination of the reference block comprised in the patches using the determined weights. Then the determined weights have to be encoded to enable reconstruction.

Much the same way, the weights can be determined as to minimize rate-distortion costs of encoding of a residual of the current patch comprising the block to be predicted and its template with respect to a weighted linear combination of the reference patches using the determined weights. Again, the determined weights have to be encoded to enable reconstruction.

Alternatively, weights can be determined as to minimize rate-distortion costs of encoding of a residual of the template of the block to be predicted with respect to a weighted linear combination of the reference templates comprised in the patches using the determined weights. In this case, weights can be determined the same way by encoder and decoder and there is no need for encoding weights.

Figure 3:
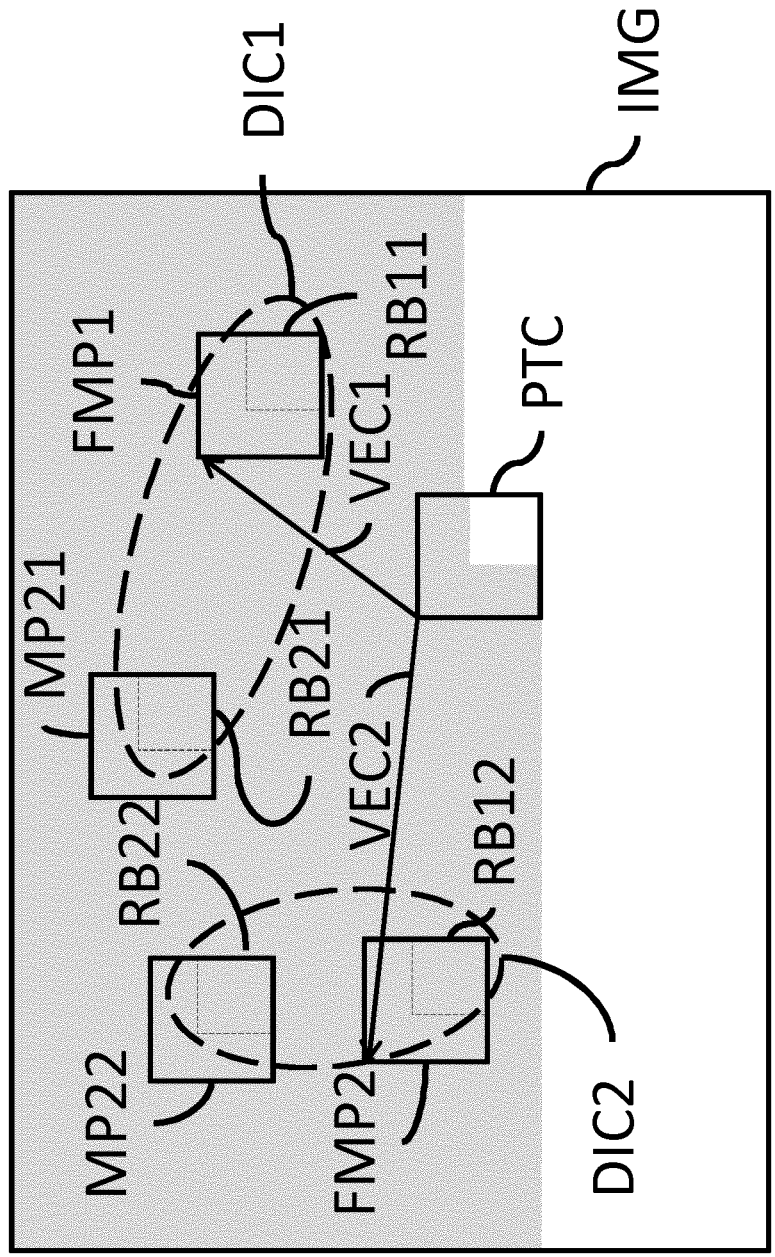
FIG. 3 depicts an exemplary embodiment of an optimized map-aided neighbour embedding.

As exemplarily depicted in FIG. 3, the concept can be further expanded towards n candidate sets DIC1, DIC2, each comprising k patches exemplarily depicted in FIG. 3 for n=2 as FMP1 and FMP2. That is, it is not only determined the closest reference patch FMP1 of the current patch PTC comprising the block BLK to be predicted plus its corresponding neighbourhood TPL, but a set of n closest reference patches FMP1, FMP2 of the current patch.

For each of said n closest reference patches FMP1, FMP2, the proposed method comprises searching for (k−1) further reference patches MP21, MP22 being the (k−1) closest matches of the respective one of the n closest reference patches FMP1, FMP2 and determines corresponding rate-distortion cost minimizing weights. The one of the n candidate sets is chosen which results in rate-distortion cost not higher than that of any other the other candidate sets. The one of vectors VEC1, VEC2 referencing the closest reference patch of the chosen candidate set is the one encoded or decoded.

Due to allowing for a more global minimization of rate-distortion cost, good predictions can be achieved without any necessity for encoding weights using weights determined as to minimize rate-distortion costs of encoding of a residual of the template of the block to be predicted with respect to a weighted linear combination of the reference templates comprised in the patches using the determined weights.

In other words, the underlying basic idea of this embodiment is to select the k reference patches via an "optimum" matching vector that will minimize a given criterion. Thereby, the matching vector used will help finding reference blocks better adapted than state of the art neighbour embedding based prediction.

An exemplary embodiment of the concept expanded to k patches is a so-called oMANE embodiment (optimized Map-Aided Neighbourhood Embedding) which performs a three step search of k blocks to be combined in weighted linear combination for block prediction:

1) L reference patches FMP1, FMP2 of the patch PTC comprising the block BLK and an adjacent neighbourhood or template TPL are determined. The L reference patches FMP1, FMP2 are those most closely resembling the patch PTC in terms of a distance measure based on the embedding prediction error, for instance Euclidian distance. Each reference patch FMP1, FMP2 is associated with a respective reference vector VEC1, VEC2.

2)—For each reference patch FMP1, FMP2 found in step 1, a dictionary DIC1, DIC2 is built which comprises a respective reference block RB11, RB12 comprised in the reference patch FMP1, FMP2 and k−1 further reference blocks RB21, RB22 comprised in further patches MP12, MP22 matching or resembling the reference patch FMP1, FMP2 and a prediction is determined using a weighted linear combination of the blocks in the dictionary.

3)—To select a set of weights $V^1$ associated with the one of the L dictionaries that will be retained to predict the current block, two distance measures can be then considered: the one is a distance measure based directly on the embedding prediction error, for instance it can be minimized sum of square errors between prediction $A_u^1 V^1$ which is based on dictionary $A_u^l$ and current block $X_u$ to-be-predicted to obtain the best prediction $l_{opt}$.

$$l_{opt} = \operatorname*{argmin}_{1 \le l \le L} \|X_u - A_u^l V^l\|_2^2$$

The second one is a distance measure based on the embedding rate-distortion cost in case it is desirable to select the prediction that provides the best compromise between the quality of the reconstructed block and the coding cost of the block. That is it is minimized a Rate-Distortion cost in order to select the prediction that provides the best compromise between the quality of the reconstructed block and the coding cost of the block, i.e., $$l_{opt} = \operatorname*{argmin}_{1 \le l \le L} \|D^l - \lambda R^l\|_2^2$$

where λ is a Lagrangian parameter, $D^l$ represents the distortion between the current block and the reconstructed block by using the SSE distance metric, and $R^l$ being the coding cost at least of encoding residual of the block with respect to the prediction $A_u^l V^l$ which is based on dictionary $A_u^l$. Coding costs of syntax elements can be further taken into account.

Finally the reference vector associated with the reference patch of the selected dictionary is encoded.

Compared to state of the art, the invention has the advantages to improve Rate Distortion performance.

Exemplary targeted industrial applications are video distribution (inc. compression) and display technologies.

Applications related to video compression and content representation are also concerned.

The invention claimed is:

1. A method for encoding a block of an image, the method comprising:
   encoding and reconstructing a part of the image,
   determining one reference block such that one reference patch, comprising one reference neighborhood adjacent to said one reference block and said reference block, resembles a patch, comprising a corresponding neighborhood of the block to be encoded and the block to be encoded,
   determining at least one further reference block such that, for each further reference block, a further reference patch comprising a further reference neighborhood of said further reference block and said further reference block, resembles said one reference patch,
   measuring a resemblance between two patches by means of a distance, and
   encoding a vector having as its origin the patch comprising the block to be encoded and pointing to the one reference patch and a residual of the block with respect to a combination of the one and the at least one further reference block.

2. The method of claim 1, wherein the combination of the one and the at least one further reference block is a weighted linear combination, wherein weights for said weighted linear combination are determined by solving a constrained least square problem or a non local mean problem.

3. The method of claim 2, wherein weights for said weighted linear combination are determined from the neighborhood adjacent to the block and the one neighborhood adjacent to the one reference block and at least one further neighborhood adjacent to the at least one further reference block.

4. The method of claim 2, wherein weights for said weighted linear combination are determined using the block and the one reference block and the at least one further reference block and wherein weights are encoded.

5. The method of claim 2, wherein the constrained least square problem is solved using locally linear embedding or non-negative matrix factorization.

6. The method of claim 2, further comprising:
   using at least the block for determining at least one other reference block in the reconstructed part and at least one other vector referencing the at least one other reference block,
   using the at least one other reference block for determining at least one further other reference block in the reconstructed part of the image, and
   determining that prediction error or rate distortion-cost of a further residual of the block with respect to a further weighted linear combination of the one other and the at least one further other reference block is higher than prediction error or rate-distortion-cost of the residual.

7. A device for encoding a block of an image, the device comprising at least one processor configured to:
- encode and reconstruct a part of the image,
- determine one reference block such that one reference patch, comprising one reference neighborhood adjacent to said one reference block and said reference block, resembles a patch, comprising a corresponding neighborhood of the block to be encoded and the block to be encoded,
- determine at least one further reference block such that, for each further reference block, a further reference patch comprising a further reference neighborhood of said further reference block and said further reference block, resembles said one reference patch,
- measure a resemblance between two patches by means of a distance, and
- encode a vector having as its origin the block to be encoded and pointing to the one reference patch and a residual of the block with respect to a combination of the one and the at least one further reference block.

8. The device of claim 7, wherein the combination of the one and the at least one further reference block is a weighted linear combination, wherein weights for said weighted linear combination are determined by solving a constrained least square problem or a non local mean problem.

9. The device of claim 8, wherein weights for said weighted linear combination are determined from the neighborhood adjacent to the block and the one neighborhood adjacent to the one reference block and at least one further neighborhood adjacent to the at least one further reference block.

10. The device of claim 8, wherein weights for said weighted linear combination are determined using the block and the one reference block and the at least one further reference block and wherein weights are encoded.

11. The device of claim 8, wherein the constrained least square problem is solved using locally linear embedding or non-negative matrix factorization.

12. The device of claim 8, wherein the at least one processor is further configured to
- use at least the block for determining at least one other reference block in the reconstructed part and at least one other vector referencing the at least one other reference block,
- use the at least one other reference block for determining at least one further other reference block in the reconstructed part of the image, and
- use that prediction error or rate distortion-cost of a further residual of the block with respect to a further weighted linear combination of the one other and the at least one further other reference block is higher than prediction error or rate-distortion-cost of the residual.

13. A method for reconstructing a block of an image from a reconstructed part of the image, the method comprising:
- decoding a part of the image,
- decoding an encoded residual of the block and decoding an encoded vector having as its origin a patch comprising the block to be encoded and pointing to a reference patch in the reconstructed part of the image, said reference patch comprising one reference neighborhood adjacent to one reference block and said reference block,
- determining at least one further reference block such that, for each further reference block, a further reference patch comprising a further reference neighborhood of said further reference block and said further reference block, resembles said reference patch,
- resemblance between two patches being measured by means of a distance, and
- reconstructing the block by combining the residual with a combination of the reference block and the at least one further reference block.

14. The method of claim 13, wherein the combination of the reference block and the at least one further reference block is a weighted linear combination, wherein weights for said weighted linear combination are determined from a neighborhood adjacent to the block and the one reference neighborhood adjacent to the one reference block and at least one further neighborhood adjacent to the at least one further reference block by solving a constrained least square problem or a non local mean problem.

15. The method of claim 14, wherein the constrained least square problem is solved using locally linear embedding or non-negative matrix factorization.

16. The method of claim 13, wherein the combination of the reference blocks is a weighted linear combination, the method further comprising decoding encoded weights for said weighted linear combination.

17. A device for reconstructing a block of an image from a reconstructed part of the image, the device comprising at least one processor configured to:
- decode a part of the image,
- decode an encoded residual of the block and decoding an encoded vector referencing a reference patch in an the reconstructed part of the image, said reference patch comprising one reference neighborhood adjacent to one reference block and said reference block,
- decode at least one further reference block such that, for each further reference block, a further reference patch comprising a further reference neighborhood of said further reference block and said further reference block, resembles said reference patch,
- measure a resemblance between two patches being measured by means of a distance, and
- reconstruct the block by combining the residual with a combination of the reference block and the at least one further reference block.

18. The device of claim 17, wherein the combination of the reference block and the at least one further reference block is a weighted linear combination, wherein weights for said weighted linear combination are determined from a neighborhood adjacent to the block and the one reference neighborhood adjacent to the one reference block and at least one further neighborhood adjacent to the at least one further reference block by solving a constrained least square problem or a non local mean problem.

19. The device of claim 18, wherein the constrained least square problem is solved using locally linear embedding or non-negative matrix factorization.

20. The device of claim 17, wherein the combination of the reference blocks is a weighted linear combination, the method further comprising decoding encoded weights for said weighted linear combination.

21. A device for encoding a block of an image, the device comprising:
- an encoder for encoding and reconstructing a part of the image,
- a processor combined with a memory configured to determine one reference block such that one reference patch, comprising one reference neighborhood adjacent to said one reference block and said reference block, resembles a patch, comprising a corresponding neighborhood of the block to be encoded and the block to be encoded, a processor combined with a memory configured to determine at least one further reference block such that, for each further reference block, a further reference patch comprising a further reference neighborhood of said further reference block and said further reference block, resembles said one reference patch, a processor combined with a memory configured to determine a resemblance between two patches being measured by means of a distance, and an encoder for encoding a vector having as origin the block to be encoded and pointing to the one reference patch and a residual of the block with respect to a combination of the one and the at least one further reference block.

22. The device of claim 21, wherein the combination of the one and the at least one further reference block is a weighted linear combination, wherein weights for said weighted linear combination are determined by solving a constrained least square problem or a non local mean problem.

23. The device of claim 22, wherein weights for said weighted linear combination are determined from the neighborhood adjacent to the block and the one neighborhood adjacent to the one reference block and at least one further neighborhood adjacent to the at least one further reference block.

24. The device of claim 22, wherein weights for said weighted linear combination are determined using the block and the one reference block and the at least one further reference block and wherein weights are encoded.

25. The device of claim 22, wherein the constrained least square problem is solved using locally linear embedding or non-negative matrix factorization.

26. The device of claim 22, further comprising:

a processor combined with a memory configured to use at least the block for determining at least one other reference block in the reconstructed part and at least one other vector referencing the at least one other reference block, a processor combined with a memory configured to use the at least one other reference block for determining at least one further other reference block in the reconstructed part of the image, and a processor combined with a memory configured to determine that prediction error or rate distortion-cost of a further residual of the block with respect to a further weighted linear combination of the one other and the at least one further other reference block is higher than prediction error or rate-distortion-cost of the residual.

27. A device for reconstructing a block of an image from a reconstructed part of the image, the device comprising:

a decoder for decoding a part of the image, a decoder for decoding an encoded residual of the block and decoding an encoded vector having as origin a patch comprising the block to be encoded and pointing to a reference patch in an the reconstructed part of the image, said reference patch comprising one reference neighborhood adjacent to one reference block and said reference block, a processor combined with a memory configured to determine at least one further reference block such that, for each further reference block, a further reference patch comprising a further reference neighborhood of said further reference block and said further reference block, resembles said reference patch, a processor combined with a memory configured to determine resemblance between two patches being measured by means of a distance, and a processor combined with a memory configured to reconstruct the block by combining the residual with a combination of the reference block and the at least one further reference block.

28. The device of claim 27, wherein the combination of the reference block and the at least one further reference block is a weighted linear combination, wherein weights for said weighted linear combination are determined from a neighborhood adjacent to the block and the one reference neighborhood adjacent to the one reference block and at least one further neighborhood adjacent to the at least one further reference block by solving a constrained least square problem or a non local mean problem.

29. The device of claim 28, wherein the constrained least square problem is solved using locally linear embedding or non-negative matrix factorization.

30. The device of claim 27, wherein the combination of the reference blocks is a weighted linear combination, the method further comprising decoding encoded weights for said weighted linear combination.

* * * * *